United States Patent
Holland

[15] 3,635,343
[45] Jan. 18, 1972

[54] FILTRATION SYSTEM

[72] Inventor: Richard W. Holland, 13103 Conifer, Houston, Tex. 77024

[22] Filed: Apr. 28, 1969

[21] Appl. No.: 819,845

[52] U.S. Cl...................210/104, 210/121, 210/193, 210/298, 210/406
[51] Int. Cl....................................................B01d 29/24
[58] Field of Search..........................210/104, 206–208, 210/303, 306, 346, 203, 523, 75, 121, 193, 298, 406

[56] References Cited

UNITED STATES PATENTS

| | | | |
|---|---|---|---|
| 448,122 | 3/1891 | Chancellor | |
| 1,800,517 | 4/1931 | Foster | 210/206 |
| 2,035,851 | 3/1936 | Walker | 210/104 |
| | | | 210/346 |
| 2,540,362 | 2/1951 | Winslow et al. | 210/306 X |
| 2,678,912 | 5/1954 | Kalinske et al. | 210/523 X |
| 2,919,029 | 12/1959 | Smith | 210/305 |
| 3,339,736 | 9/1967 | Muller | 210/104 |
| 1,716,040 | 6/1929 | Genter | 210/406 X |
| 3,334,749 | 8/1967 | Ladd | 210/298 X |

Primary Examiner—Samih N. Zaharna
Attorney—Donald Gunn

[57] ABSTRACT

For use in filtering a fluid which is susceptible to light and heavy solids and other materials suspended in the liquid, a filtration system which removes the heavier and lighter suspended particles through settling and skimming whereupon the suction of a downstream pump draws the liquid through the filter apparatus, the filter apparatus functioning after removal of the heavier and lighter contaminants which typically clog filter media, all the apparatus included in an open tank.

7 Claims, 8 Drawing Figures

PATENTED JAN 18 1972
3,635,343
SHEET 1 OF 2
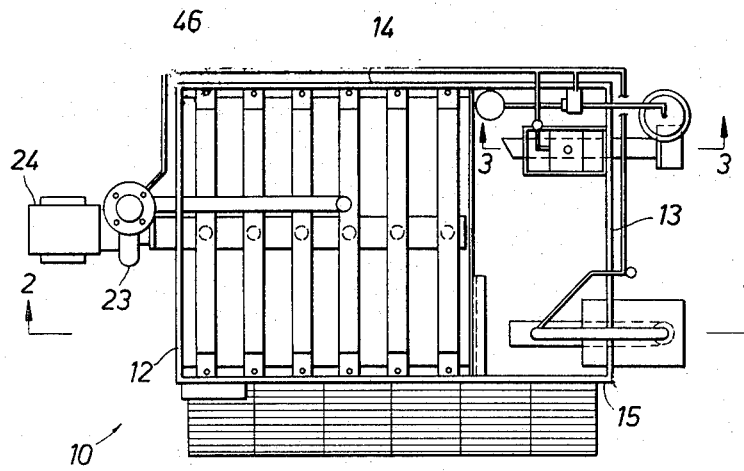
FIG. 1
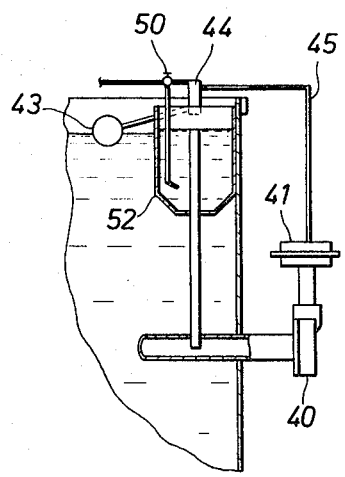
FIG. 3
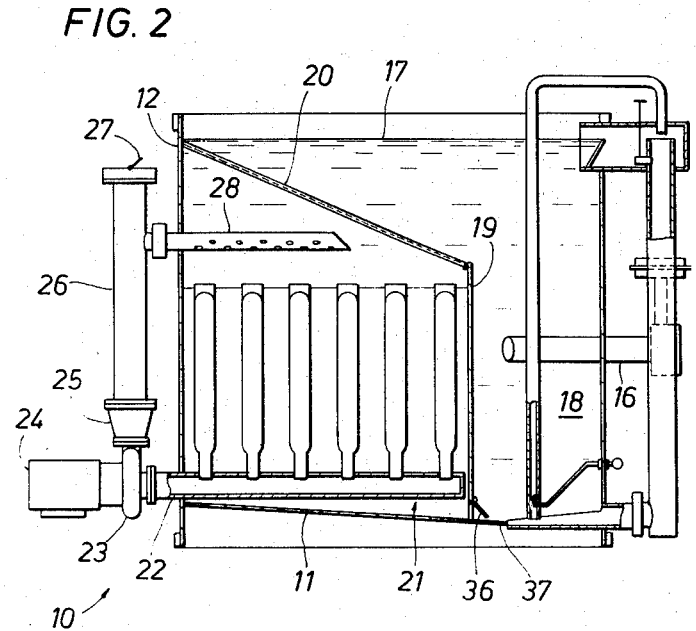
FIG. 2
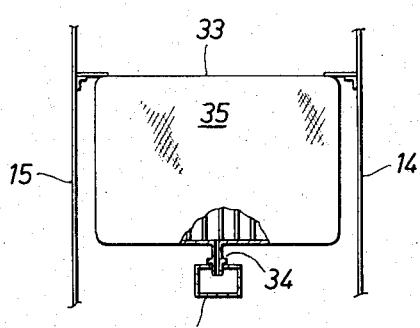
FIG. 4
FIG. 5
Richard W. Holland
INVENTOR
BY Donald Gunn
ATTORNEY

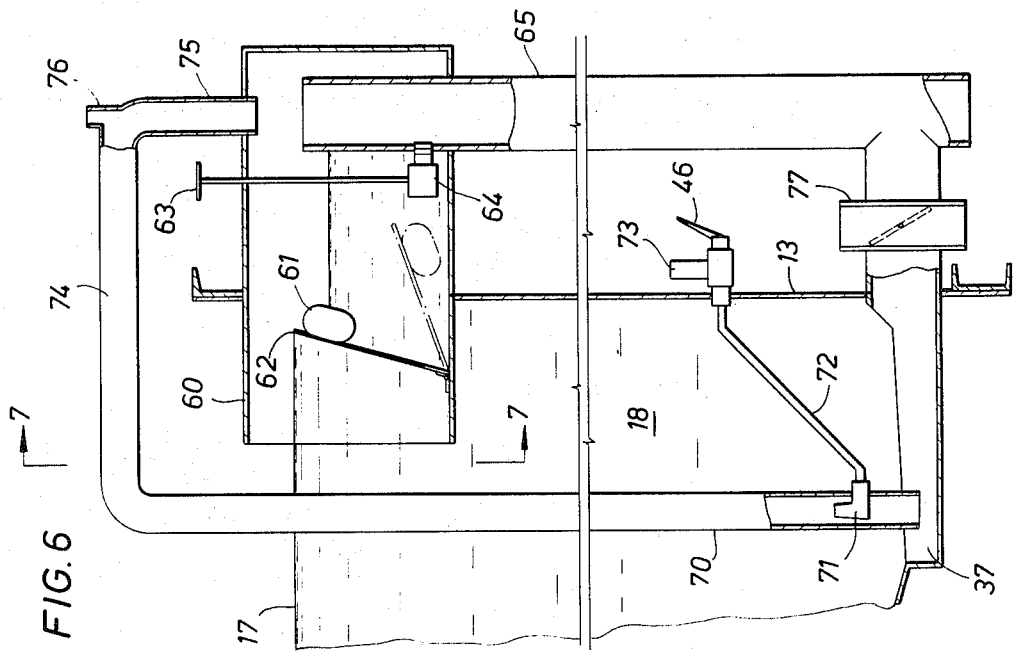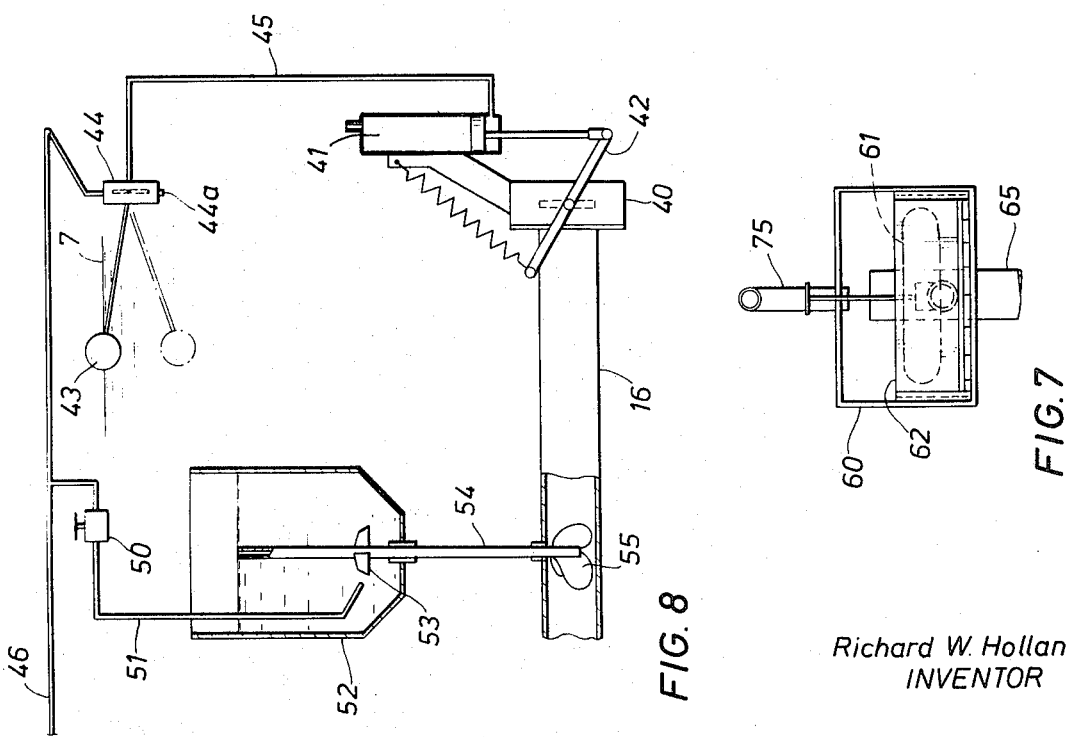

FILTRATION SYSTEM

SUMMARY OF PROBLEM AND SOLUTION

Filtration equipment commonly available for use with industrial plant water, process fluids, and pollution control equipment normally utilizes a filter leaf nest through which the contaminated fluid is forced under pressure. Typically, this requires a pressuretight vessel, an inherently expensive structure built to close tolerances, and equipped with necessary gaskets and other sealing apparatus. Routinely, the fluid to be filtered is forced into the vessel under pressure and is forced through the filtration media. Inasmuch as the entire filtration process occurs within a heavy closed vessel maintained under pressures greater than atmospheric pressure, certain problems arise with the control and servicing of the equipment. It is particularly difficult to service the equipment for periodical cleaning of the filtration media.

Optimum filter operation is achieved when the fluid is retained for a length of time prior to reaching the filtration media. Additionally, filtration is enhanced when the cleansed fluid is partially recycled thus increasing the retention time. However, when the fluid is forced through the media under pressure, the skin formed on the face of the filtration media and maintained there by the pressurized flow of the fluid through the filter media materially reduces the efficiency of the filter and shortens the retention time.

Pressurized filter systems of this type have in the past materially increased the skin formed on the filtration media. Broadly, two types of contaminants tend to unduly clog the filtration media. Heavier contaminants which are merely carried in the fluid when pumped under pressure tend to clog the filtration media. Also, lighter contaminants which are dispersed in the fluid, such as oil in water, will likewise clog the filtration system. In either case, the lighter and heavier filtration contaminants are found on the face of the filtration media where they form a dense skin cake which must be periodically removed. Inasmuch as the filtration media is intended to remove contaminants, this leads to a material reduced efficiency in the use of the filtration equipment.

The foregoing has pointed out certain deficiencies found in the prior art. The present invention is summarized as providing an open tank filtration system which is powered by a suction pump operating at the outlet of the filtration system, which draws the fluid through the apparatus. Hence, a pressure-type vessel is not required, and moreover, the pump is the sole motive means required for the present invention. The tank includes a coated filter leaf nest which is submerged in the liquid to be filtered. The contaminated fluid is brought into the tank at a stilling well which calms the agitated liquid to thereby permit heavy solids suspended in the liquid to settle, the apparatus providing means for removing the heavy solids. In the calm environment, the lighter materials, typically oil in water, float to the surface. The surface portions of the liquid are passed through a skimming apparatus which removes the lighter contaminants. Through the prior removal of suspended solids in the liquid, the skin cake on the filter media is materially reduced and typically less clogging even when formed so that the periodic cleaning is reduced and the power required to draw the liquid through the apparatus is measurably reduced. The nonfiltered contaminants are removed from the filter system using energy derived from the sole pump source. The entire system, being of an open or exposed configuration, permits complete control and servicing of the apparatus with a minimum of effort and cost.

Many objects and advantages of the present invention will become more readily apparent from a consideration of the included specification and drawings wherein:

FIG. 1 is a plan view of the filter system of the present invention showing the downstream pump location and other components within the tank;

FIG. 2 is a sectional view taken along the line 2—2 of FIG. 1 which shows the relative location of the filter media and a portion of the apparatus which removes the suspended contaminants;

FIG. 3 is a sectional view taken along the line 3—3 of FIG. 1 showing details of the apparatus which dissolves coagulant chemicals in the liquid, if desired;

FIG. 4 is a view of a filter leaf as mounted in the tank;

FIG. 5 is an enlarged view of a support for an individual leaf attached to the tank rail;

FIG. 6 is an enlarged view of the airlift and surface skimmer shown also in FIG. 2;

FIG. 7 is an end view of the skimmer weir taken along the line 7—7 of FIG. 6; and, FIG. 8 is an enlarged view of the level control system partly shown in FIG. 3 which illustrates flow control of the liquid to be filtered.

Attention is first directed to FIGS. 1 and 2 of the drawings which illustrate the exposed open top tank of the present invention which is indicated by the numeral 10. The filtration system 10 incorporates a bottom plate 11 shown in FIG. 2, suitable end plates 12 and 13, and sidewall plates 14 and 15. As will be understood, the tank may be exceedingly large with several sets of filtration apparatus, or may be measurably smaller dependent on the circumstances of its installation and operation.

The numeral 16 indicates the influent nozzle which delivers the liquid 17 to the filter 10. It will be understood that the liquid is perhaps loaded with suspended heavy and light particles and impurities. For sake of explanation, but not as a limitation on the present invention, the preferred embodiment will be described in operation with water and the lighter contaminants will include oil, the heavier contaminants will include silt. The lighter and heavier pollutants will be identified as contaminants while the filter removes suspended pollutants of any particular description. Plant influent and effluent typically have need of filtration of the above general description. However, the apparatus of the present invention may be used with other liquids and pollutants, and the description in conjunction with a plant filter system is not a limitation on the present invention.

The nozzle 16 directs the incoming liquid into a stilling well 18 which is generally defined by the end wall 13 and a baffle wall 19 immediately in the front of the nozzle 16. The volume of liquid held in the stilling well 18 is sufficient to have a measurable retention time for each portion of the liquid introduced to the filter 10. Moreover, the baffle wall 19 extends upwardly to define a portion of the stilling well and is then connected to a baffle grid 20 which separates the portion of the equipment having the filter nest from the stilling well 18. The water enters the stilling well through the nozzle 16 and travels quite slowly through the baffle grid 20 into the filter means which are indicated generally by the numeral 21 in FIG. 2.

The filter means 21 incorporates a collection header 22 which extends through the end wall 12 toward the baffle wall 19. The header 21 is communicated with a suction pump 23 powered by a suitable motor 24 which forces the liquid through a discharge nozzle 25 and into an outlet header 26. A balance valve 27 is located in the header 26 for directing some of the filtered liquid through a dispersing nozzle 28 which returns through the wall 12 to the filter means 21. The dispersing nozzle is useful in filter aid sluicing and for recycling a portion of the filtered liquid to increase the retention time in the filter. As will be appreciated, the portion of liquid returned to the filter for recycling may vary from 0 percent to approaching 100 percent, dependent on a number of circumstances in the operation of the present invention.

The collection header 22 is preferably a rectangular hollow member as shown in FIG. 4. A number of filter leaves are supported in parallel by parallel tank rails 30 shown in FIG. 5. The tank rail is preferably formed of angle stock and a leaf clip 31 extends from the tank rail on a bolt 32. The leaf clip 31 supports an individual filter leaf 33 as shown in FIG. 5 with a support being provided at the upper left- and upper right-hand corners as shown in FIG. 4. The individual filter leaf 33 shown in FIG. 4 is preferably a rectangular filter structure having a bottom central drain 34 which plugs into an opening in the collection header 22. The drain 34 provides the structural support and alignment of the leaf filter 33 in conjunction with the filter clips 31. The leaf clip 31 is preferably an inverted U-shaped retainer which clamps the filter leaf on the front and back faces to true the filter in position to be parallel with the other filters as shown in FIGS. 1 and 2. The filter leaf 33 preferably includes a screen surface 35 which can optionally be coated with a filtering aid such as a diatomaceous material.

The number of particular filter leaves in the filter nest means 21 is clearly subject to variation dependent on the size of the installation and the cycle time permitted infiltration. Moreover, the apparatus may be expanded to provide a very substantial measurable surface are of filtration communicating with the collection header 22. Of significance to the present invention is the fact that the filter clips 31 may be readily removed, even during operation, and the individual filter lifted out. In FIG. 4, it will be noted that the drain 34 at the bottom of each filter 33 preferably rests on a collar which supports it in communication with the collection header 22. Should an individual filter be removed, the opening in the header is preferably temporarily plugged until the filter 33 is returned to its position.

The turbulence where the filter elements are located preferably receives the liquid after it has been stilled upon flowing through the baffle grid 20. Since the extent of turbulence is measurably reduced, there is some possibility of heavier sediment falling from the liquid in the chamber containing the filtration means 21, and hence, the lower floor 11 is sloped to the right as viewed in FIG. 2 and a hinged flap 35 drains the leaf nest chamber to a waste trough 37. The waste trough will be considered later in conjunction with other portions of the apparatus which remove the heavier and lighter contaminants from the liquid 17.

At this juncture, it is helpful to describe how the liquid 17 enters the filter apparatus 10. The numeral 40 indicates a level control valve shown in FIGS. 3 and 8. The valve 40 is spring loaded to close and is opened by operation of the cylinder 41. The cylinder 41 operates the control arm 42 to control fluid flow through the inlet nozzle 16. The ball float 43 responding to the surface of the liquid 17 positions a throttling valve 44 to vary the pressure range from maximum pump pressure to full venting with infinite intermediate values in a fluid line 45 communicating with the cylinder 41. The valve 44 is a conventional bought three-way valve with a vent 44a to the tank. The valve 44 vents from the pump 23 or the cylinder 41 causing equilibrium between the spring force and cylinder force. In lieu of the return spring, the upstream or feed pressure may be used to return the cylinder 41.

A significant feature of the present invention is the utilization of only the pump means 23 to power the influent control valve 40 shown in FIGS. 3 and 8. Dependent on the level of the float, the valve 44 regulates the pressure in actuating cylinder 41 thus moving the valve 40 to a compensating position. In the absence of pressure as might occur on a pump failure, the valve 40 is held closed. When the influent valve is closed, it is impossible to flood the filter of the present invention and to have spillage. Thus, a fail safe arrangement is provided whereby influent is introduced to the filter 10 only when the pump 23 continues removing purified liquid from the filter 10. Thus, the sole source of power is the power required for the pump motor 24. Other sources of energy are not required for the present invention.

Continuing the description of FIGS. 3 and 8 together, it will be noted that a small hand-operated valve 50 directs liquid under pressure through a conduit 51 into a chemical additive tank indicated by the numeral 52. The tank 52 is adapted to receive a quantity of chemical additives which typically enhance operation of the filter 10 of the present invention. The chemicals may be in dry powder form, may be a wet slurry, or may be concentrated liquid. Numerous chemical additives which enhance the filtration process such as flocculants may be customarily added, depending on the particular liquid and impurities to be filtered. Of course, the apparatus may be operated completely without chemical additives as desired. In any event, the chemical additives are placed in the tank 52 shown in enlarged view in FIG. 8.

The conduit 51 which extends into the tank is directed toward an impeller blade 53. The impeller blade 53 is mounted on a hollow rotatable shaft 54. The shaft passes through a suitable packing gland at the bottom of the container 52 and extends through the upper wall of the influent nozzle 16 and supports a second impeller blade 55. The shaft 54 is hollow and is open at its upper end as shown in FIG. 8 in the container 52. Additionally, the shaft 54 is hollow and provides an opening into the nozzle 16. The conduit 51 is directed toward the impeller 53 with a view of rotating the shaft 54. The impeller 55 located in the influent line is also driven by the flowing liquid. The two impellers together rotate the shaft 54. The impeller 53 in the container 52 stirs and churns the incoming fluid from the line 51 with the chemical, of whatever nature or form, and, dependent on the setting of the rate valve 50, slight overflow occurs during operation of the equipment. As the level in the container 52 rises, the chemical laden water overflows into the pipe 54 and is drawn downwardly into the nozzle 16. The agitation in the chemical container 52 stirs the liquid with the chemicals to carry the suspended or dissolved chemicals into the nozzle 16 to be introduced into the settling basin 18. The chemicals are dispersed in the liquid in the filter 10 and serve their purpose in the customary or intended manner. Dependent on the setting in the valve 50 and the measure of chemicals placed in the container 15, a controlled rate of introduction of the chemical to the filter 10 is obtained through the arrangement shown above. Of particular interest is the fact that no separate motive means is required for operation of the ratably controlled chemical induction system. Again, it is dependent on the continued operation of the pump 23 shown in the drawing. Hence, a failure of the pump 23 leads to a complete shut down of the equipment shown in FIGS. 3 and 8, and prevents undesirable accidents through the use of the present invention.

As mentioned several times in the present disclosure, the liquid introduced to the filter 10 is sometimes laden with heavy suspended particles and with lighter impurities, typically oil, which is suspended in the liquid. While the heavier particles settle out and are disposed of in the manner to be described, the lighter contaminants float to the surface. In FIG. 6, the apparatus removing the lighter impurities is shown. Briefly, the liquid level rises to enter the skimming apparatus. The numeral 60 indicates a skimmer box which is positioned at a level accommodating the range of levels of the liquid 17 in the filter 10. A float 61 buoys up a skimming weir 62 which is hinged to the skimmer box 60. The upper edge of the weir 62 is just below the level of the liquid so that a thin sheet of water spills over the skimming weir into the skimmer box proper. The weir 62 is hinged to the lower portions of the box 60 to permit it to rise and fall with the various liquid levels in the filter apparatus 10. The dotted line position of the weir 62 shown in FIG. 6 illustrates the range of movement of the weir 62. As the water level rises, the float 61 carries the weir 62 toward its upright posture, all the while a thin sheet of impurities in the water spilling over the top edge of the weir. The thin layer of water spilling over the weir typically will carry oil or flotsom into the skimmer box chamber for disposal.

The numeral 63 indicates the control handle of a valve 64 in the skimmer box 60. The valve 64 communicates with an overflow pipe 65 which provides for waste disposal. It will be noted that the very upper end of the overflow pipe 65 is located to drain the skimmer box 60 should the level rise too high. The valve 64 is adjusted to drain the skimmer box 60 at a controlled rate dependent on the quantity of impurities skimmed from the surface of the water.

The foregoing describes that portion of the apparatus which removes the lighter contaminants carried in the water 17. FIG. 6 also illustrates in enlarged detail the apparatus for removing heavier contaminants from the stilling well 18. The sediment well 37 previously described with regard to FIG. 2 is included in FIG. 6. As mentioned before, heavier particles tend to settle into the well 37. The apparatus includes a lift tube 70 having an open mouth in the waste trough 37. A jet nozzle 71 injects fluid upwardly into the lift tube 70. The nozzle 71 is communicated by a conduit 72 with a control valve 73 which admits liquid under pressure from the tubing 46 shown in FIG. 1. It is quite important to note that the conduit 46 is communicated with the pump 23. The disposal apparatus for the heavier sediment is powered solely from the pump 23. Hence, the apparatus functions so long as the equipment as a whole is operative and the need for extraneous connections of power means to the present apparatus is thereby avoided. While an independent power means may be used, the foregoing is considered a virtue and an independent power means would be adopted only for special purposes or reasons.

In any event, the jet 71 is directed upwardly in the draw pipe 70. The valve 73 is preferably an inspirator valve of a nature believed readily known to those skilled in the art. The inspirator valve inducts air into the fluid flow which tends to reduce the specific gravity of the liquid in the draw pipe 70 and creates an upward flow. The heavy sediment in the sediment basin 37 is lifted in the draw pipe 70 and when mixed with the upwardly directed stream of air and water from the jet 71, the combined liquids have a lower fluid density and hence flow up the lift tube 70 toward a compensating level. However, the draw pipe 70 is curved at the portion 74 and is downwardly directed at 75 into the waste overflow pipe 65. An air vent 76 releases bubbles entrained in the liquid flow, thereby increasing the density of the mixture causing it to readily drop into the waste overflow pipe 65. The pipe 65 carries away the waste from the draw pipe 70. It should be noted that the sediment trough 37 is communicated by way of a normally closed valve 77 communicating with the waste pipe 65. Should the occasion arise at which a draining of the sediment basin 37 is desired, the valve 77 may be briefly opened and the large rate of flow will quickly clean the bottom of the tank.

The foregoing has described the various and sundry components of the present invention, and more particularly, has directed attention to the various features of the present invention. The several features should be considered cooperatively and a greater understanding of the present invention will be obtained by tracing through the operation of the present invention. As mentioned before, the apparatus is assumed to be cooperative with a plant for purification of the water, which has both heavier and lighter trash or sediment in the water as well as for purposes of removing various suspended impurities. Of course, the apparatus may be used with other liquids to remove many other impurities.

In operation, the control valve 40 is connected with a source of liquid to be purified. The liquid is admitted to the filter system 10 through the nozzle 16 and begins to fill the stilling well 18. AS the level of the liquid rises within the stilling well, the heavier sediment falls out toward the sediment trough 37 as previously described. Also, the lighter impurities in the liquid rise to the upper surface for removal by the skimming apparatus shown clearly in FIGS. 6 and 7. Of course, the baffle grid 20 communicates the liquid to the filter nest for purification by the apparatus. The pump 23 draws liquid through the filter nest and the various individual filter elements in the nest. The purified water is collected in the header 22 drawn by the suction of the pump 23 and is delivered through the outlet header 26. The filter elements remove the suspended impurities in the manner described above, it being noted that the surfaces of the various filter elements are protected by the absence of clogging impurities. By clogging impurities, reference is had to the effect of trash or oil on the screen surfaces, to name a few of several clogging impurities.

The lighter impurities or contaminants skimmed from the surface and the heavier sediment collected at the bottom of the apparatus are removed through the waste disposal tube 65 as described. The absence of these impurities from the water passing through the filter itself is particularly beneficial. The liquid is permitted a greater interval of time at the cleaning surfaces, which markedly improves the quality of operation of the apparatus. There is measurably less tendency of the filter surfaces to form a skin of impurities tending to block further operation of the filters and, there is typically little or no coagulation of the various impurities as might occur when many impurities adhere to oil droplets or the like.

A particular benefit of the present invention is the utilization of an open top apparatus. This avoids the manufacturing requirements of a pressurized vessel with the essential gaskets and other sealing members. More particularly, this permits a visual inspection of the apparatus during its operation. Thus, a visual inspection of the skimmer box is readily had. Likewise, the baffle grid 20 may be inspected to be certain that large debris is not collected thereon, indicating an overloading of the system. Should one of the particular filters become faulty in operation, it is readily removed from the apparatus. This requires removal of the baffle grid 20 if used and disconnection of the clips 31 as shown in FIG. 5. The individual filter may be removed and the opening in the collection header 22 is either plugged or a new filter connected to it. In either case, this can be done while the apparatus continues to operate. Removal of the individual filters in the manner described above is enhanced upon hinging the baffle grid 20 to the baffle wall 19 to permit its movement to an upright position. This continues its function in that it continues to define the settling well 18. Should servicing in the above manner be envisioned as a matter of routine, the return nozzle 20 can either be formed of a flexible material or can be hinged to permit it to swing upwardly and out of the way of the individual filters as they are removed. Thus, the filter immediately adjacent the end wall 12 shown in FIGS. 1 and 2 can be readily serviced and removed in this manner.

The foregoing is directed to the preferred embodiment of the present invention. As will be understood, the apparatus can be used with water or other liquids and various and sundry impurities of all types and kinds. Moreover, the apparatus may be moderately small or can be quite excessive in size to provide a very large volume of filtration. For instance, in a larger installation, it may be necessary to duplicate the filter nest on individual headers which all communicate with a single pump. Thus, several groups of filters may be located across the width of the apparatus. Also, the skimmer weir can be enlarged and expanded from that as shown in the drawings. This also depends on the filtration volume required. A particularly important feature of the present invention is the dependency of all portions thereof on a single power source. When the motor 24 fails to operate for any reason, or the pump 23 becomes inoperative, all portions of the apparatus cease to operate and, more importantly, the valve 40 is closed to prevent the further induction of influent. As a consequence, no alternative, supportive, or auxiliary sources of power are required by the apparatus. This feature is believed particularly important in most installations inasmuch as a single check of the operative condition of the pump 23 suffices to provide information as to the operative nature of the entire system.

While many other objects and advantages of the present invention will become more readily apparent from a reading of the foregoing, the terms adopted herein are extended to the claims appended hereto.

What is claimed is:

1. Liquid-filtering apparatus adapted for filtering liquids removing impurities of greater and lesser density therefrom and comprising: an open vessel having upright sides and a closed bottom and adapted for receiving liquids; a filtered effluent header cooperatively arranged in said vessel above said vessel bottom and having at least one opening therein; diatomaceous filtering means including at least one diatomaceous filtering element arranged in a generally upright position within said vessel and having an outlet fluidly coupled to said header opening for conducting liquids strained through said filtering element into said header, and means adapted for selectively coating said filtering element with a diatomaceous filtering agent; a liquid pump having a discharge line and a suction line fluidly coupled to said header and adapted for drawing liquids through said filtering element into said header and suction line for delivery by said discharge line at an elevated pressure; liquid supply means adapted for supplying unfiltered liquids to said vessel in sufficient quantity to fill said vessel to a level above said filtering element and including a liquid inlet, and means cooperatively associated with said vessel for defining an open liquid retention well between said filtering element and said liquid inlet for quieting unfiltered liquids entering said retention well before such liquids are drawn through said filtering element; and impurity separating means on said vessel adapted for separating from such supplied liquids impurities carried thereby having densities different than such liquids and including a sediment collection basin in the bottom of said retention well adapted for collecting sediments falling to the bottom of said retention well as liquids pass through said retention well to said filtering element, a sediment withdrawal conduit cooperatively arranged in said sediment collection basin and extended out of said retention well, an air inspirator exterior of said retention well fluidly coupled to said pump discharge line and adapted for drawing air into liquids supplied to said air inspirator by said liquid pump, and a conduit coupled to the outlet of said air inspirator and terminated in said sediment withdrawal conduit adjacent to said sediment collection basin for delivering air-bearing liquid into said sediment withdrawal conduit whereby the hydrostatic head of liquids in said retention well will discharge sediment-bearing liquids through said sediment withdrawal conduit to the exterior of said retention well upon operation of said liquid pump.

2. The filtering apparatus of claim 1 wherein said impurity separating means further include a collection tank adjacent to said retention well, and weir means cooperatively arranged between said collection tank and said retention well for drawing impurities floating on the surface of liquids in said retention well into said collection tank.

3. The filtering apparatus of claim 2 wherein said weir means include a weir member, means supporting said weir member for movement between vertically spaced positions, and a liquid float coupled to said weir member and adapted for locating said weir member at its said spaced positions in accordance with the level of liquids in said collection tank.

4. The filtering apparatus of claim 1 further including chemical supply means adapted for supplying chemicals to unfiltered liquids entering said retention well, said chemical supply means including a chemical-holding tank mounted above said liquid inlet, an upright tubular shaft rotatably journaled in said holding tank and extended downwardly into said liquid inlet and adapted for carrying chemicals from said holding tank into said liquid inlet, an impeller mounted on the upper portion of said shaft within said holding tank, and a water supply line coupled to said pump discharge line and cooperatively terminated adjacent to said impeller for rotatably driving said impeller and said shaft as chemicals are discharged from said holding tank into said tubular shaft for delivery to said liquid inlet.

5. The filtering apparatus of claim 4 wherein said impurity separating means include a collection tank adjacent to said retention well, and weir means cooperatively arranged between said collection tank and said retention well for drawing impurities floating on the surface of liquids in said retention well into said collection tank.

6. The filtering apparatus of claim 5 wherein said weir means include a weir member, means supporting said weir member for movement between vertically spaced positions, and a liquid float coupled to said weir member and adapted for locating said weir member at its said spaced positions in accordance with the level of liquids in said collection tank.

7. The filtering apparatus of claim 5 further including valve means fluidly coupled to said liquid inlet, and liquid level control means cooperatively coupled to said valve means for operating said valve means in accordance with the level of liquids in said retention well for controlling the entrance of liquids into said liquid inlet.

* * * * *